US012755059B2

(12) United States Patent
Ochotta et al.

(10) Patent No.: US 12,755,059 B2
(45) Date of Patent: Oct. 6, 2026

(54) PROTECTION OF A CIRCUIT DESIGN WITHIN A DESIGN CONTAINER

(71) Applicant: Xilinx, Inc., San Jose, CA (US)

(72) Inventors: Bin Dai Ochotta, San Jose, CA (US); Sudheendra Kusume, San Jose, CA (US); Alec J. Wong, San Jose, CA (US); Pradip K. Jha, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 207 days.

(21) Appl. No.: 18/505,173

(22) Filed: Nov. 9, 2023

(65) Prior Publication Data

US 2025/0156585 A1 May 15, 2025

(51) Int. Cl.

*G06F 21/72* (2013.01)
*G06F 30/392* (2020.01)
*G06F 115/08* (2020.01)
*H04L 9/08* (2006.01)
*H04L 9/14* (2006.01)

(52) U.S. Cl.

CPC ............ *G06F 21/72* (2013.01); *G06F 30/392* (2020.01); *H04L 9/0825* (2013.01); *H04L 9/0894* (2013.01); *H04L 9/14* (2013.01); *G06F 2115/08* (2020.01)

(58) Field of Classification Search

CPC ..... G06F 21/72; G06F 30/392; H04L 9/0825; H04L 9/0894; H04L 9/14
USPC .......................................................... 713/190
See application file for complete search history.

(56) References Cited

U.S. PATENT DOCUMENTS

| | | | | |
|---|---|---|---|---|
| 8,427,193 | B1 | 4/2013 | Trimberger | |
| 9,910,790 | B2 * | 3/2018 | Yap | G06F 12/1408 |
| 10,013,517 | B1 * | 7/2018 | Zhou | G06F 30/327 |
| 10,776,522 | B1 | 9/2020 | McNeil | |
| 11,232,219 | B1 * | 1/2022 | Ochotta | G06F 21/121 |
| 2020/0348361 | A1 * | 11/2020 | Kurts | G06F 21/606 |

* cited by examiner

*Primary Examiner* — Linglan Edwards
*Assistant Examiner* — Phuc Pham
(74) *Attorney, Agent, or Firm* — Kevin T. Cuenot

(57) ABSTRACT

A key block can be generated from a session key used by a computer-based design tool for a circuit design by encrypting the session key using computer hardware. The key block can be divided, by the computer hardware, into a plurality of sub-blocks. A plurality of enhanced sub-blocks can be generated by the computer hardware by encrypting each sub-block of the plurality of sub-blocks with a different key of a plurality of keys corresponding to a plurality of Intellectual Property (IP) cores of the circuit design. The plurality of enhanced sub-blocks can be stored in a memory.

20 Claims, 5 Drawing Sheets

PROTECTION OF A CIRCUIT DESIGN WITHIN A DESIGN CONTAINER

TECHNICAL FIELD

This disclosure relates to computer-aided design (CAD) tools and protecting circuit designs for integrated circuits.

BACKGROUND

One class of computer-aided design (CAD) tools is used to create circuit designs that may be implemented in integrated circuits (ICs). A circuit designer interacts with the CAD tool, as executed by a computer, during one or more sessions to build the circuit design within a design environment provided by the CAD tool. The source code of the design, e.g., the register transfer level (RTL) description, may be encrypted using a key. The developer is able to access the circuit design for continuing developmental efforts through the CAD tool.

The CAD tool encryption prevents unauthorized access to the circuit design and prevents structural details of the circuit design from falling into the hands of nefarious actors interested in exploiting the circuit design once deployed as an IC. While the CAD tool implements strategies to protect the key, if a bad actor were to come into possession of the key, the circuit design and any ICs implementing the circuit design may be compromised.

SUMMARY

In one or more example implementations, a method includes generating, by computer hardware, a key block by encrypting a session key used by a computer-based design tool for a circuit design. The method includes dividing, by the computer hardware, the key block into a plurality of sub-blocks. The method includes generating, by the computer hardware, a plurality of enhanced sub-blocks by encrypting each sub-block of the plurality of sub-blocks with a different key of a plurality of keys corresponding to a plurality of Intellectual Property (IP) cores within the circuit design. The method includes storing the plurality of enhanced sub-blocks in a memory.

The foregoing and other implementations can each optionally include one or more of the following features, alone or in combination. Some example implementations include all the following features in combination.

In some aspects, the method includes generating, by the computer hardware, an encrypted circuit design by encrypting the circuit design using the session key.

In some aspects, storing includes including the plurality of enhanced sub-blocks within a file with the encrypted circuit design.

In some aspects, the session key is encrypted using an asymmetric public key.

In some aspects, the key block is divided into a number of the plurality of sub-blocks based on a number of the plurality of IP cores.

In some aspects, the key block is divided into a number of the plurality of sub-blocks based on a number of the plurality of IP cores having a unique key.

In some aspects, the key block is divided into a number of the plurality of sub-blocks based on a number of different third-party vendors that provide the plurality of IP cores.

In some aspects, a one-to-one relationship exists between the plurality of enhanced sub-blocks and the plurality of sub-blocks.

In some aspects, the method includes extracting the plurality of enhanced sub-blocks from a file. The method includes recovering the plurality of sub-blocks by decrypting each enhanced sub-block of the plurality of enhanced sub-blocks using an associated key corresponding to the IP cores. The method includes forming the key block by concatenating the plurality of sub-blocks. The method includes recovering the session key by decrypting the key block using an asymmetric private key.

In some aspects, the method includes decrypting the encrypted circuit design using the session key as recovered from the key block.

In one or more example implementations, a method includes extracting a plurality of enhanced sub-blocks from a file including an encrypted circuit design. The method includes recovering a plurality of sub-blocks by decrypting each enhanced sub-block of the plurality of enhanced sub-blocks using different keys corresponding to a plurality of IP cores of the encrypted circuit design. The method includes forming a key block by concatenating the plurality of sub-blocks. The method includes recovering a session key by decrypting the key block using an asymmetric private key. The method includes decrypting the encrypted circuit design using the session key.

The foregoing and other implementations can each optionally include one or more of the following features, alone or in combination. Some example implementations include all the following features in combination.

In some aspects, a number of the plurality of enhanced sub-blocks corresponds to a number of the plurality of IP cores.

In some aspects, a number of the plurality of enhanced sub-blocks is based on a number of the plurality of IP cores having a unique key.

In some aspects, a number of the plurality of enhanced sub-blocks is based on a number of different third-party vendors that provide the plurality of IP cores.

In some aspects, a one-to-one relationship exists between the plurality of enhanced sub-blocks and the plurality of sub-blocks.

In one or more example implementations, a system includes one or more hardware processors configured (e.g., programmed) to execute operations as described within this disclosure.

In one or more example implementations, a computer program product includes one or more computer readable storage mediums having program instructions embodied therewith. The program instructions are executable by computer hardware, e.g., a hardware processor, to cause the computer hardware to initiate and/or execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer-aided design (CAD) tools and protecting circuit designs for integrated circuits. In accordance with the inventive arrangements described within this disclosure, methods, systems, and computer program products are provided that protect circuit designs and/or other data through encryption. The inventive arrangements are capable of protecting key(s) utilized by the CAD tool to encrypt circuit designs. By protecting the key(s) utilized by the CAD tool, the source code of the circuit design, e.g., the Register Transfer Level description or "RTL," a higher level of security is provided not only to the key(s) themselves, but also to the circuit design as encrypted using the key(s). This ensures that access to the source code of the circuit design through unauthorized access to the key(s) is avoided.

The inventive arrangements also provide an increased level of protection for various Intellectual Property (IP) cores that may be included in the circuit design. In many cases, third-party providers make IP cores available to circuit designers. The IP cores may be protected with strong encryption. Once the IP core and any necessary key(s) are installed on the user machine, the IP core may be utilized in the CAD tool. The source code of the IP core, however, once used in the circuit design may be protected only by the encryption provided by the CAD tool and not by the encryption of the third-party provider. Increased protection for the circuit design and key(s) used by the CAD tool to protect the circuit design ensures that any IP cores used also benefit from the increased security.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
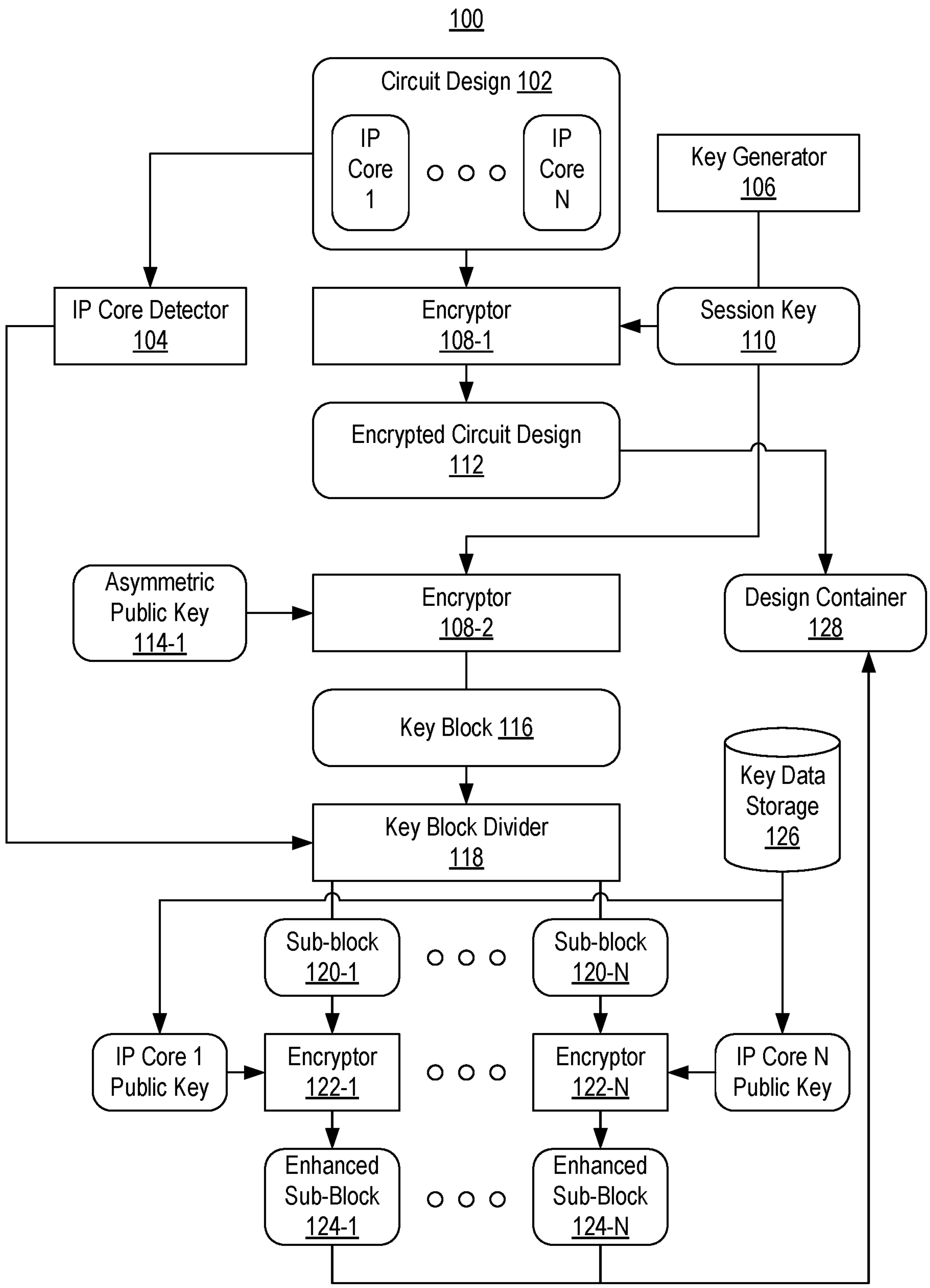
FIG. 1 is a block flow diagram illustrating an example framework that is executable by a data processing system.

FIG. 1 is a block flow diagram illustrating an example framework 100 that is executable by a data processing system. Framework 100 may be implemented as computer-readable program instructions. In one or more example implementations, framework 100 is included within a CAD tool executed by a data processing system. An example of a data processing system is described within this disclosure in connection with FIG. 5.

In the example of FIG. 1, framework 100 is configured to perform encryption to protect circuit design 102. In the example of FIG. 1, framework 100 includes an IP core detector 104, a key generator 106, one or more encryptors 108, a key block divider 118, and one or more encryptors 122. FIG. 1 is provided for purposes of illustration and may include additional program code and/or functions as described herein other than and/or in addition to the blocks shown.

Figure 2:
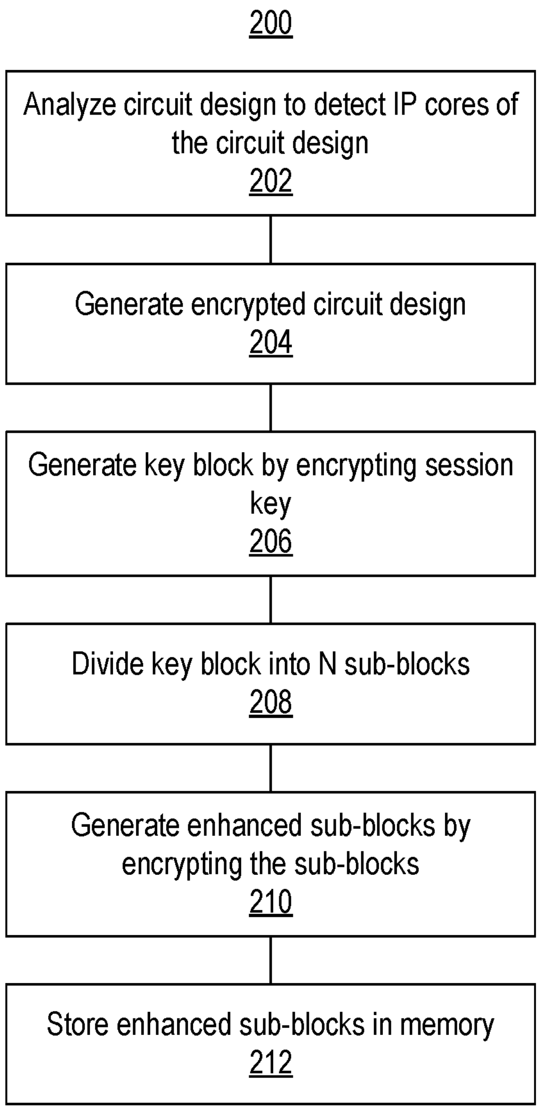
FIG. 2 is an example method illustrating certain operative features of the framework of FIG. 1.

FIG. 2 is an example method 200 illustrating certain operative features of framework 100. Referring to FIGS. 1 and 2, in block 202, framework 100 analyzes circuit design 102 to determine or detect IP cores of circuit design 102. The IP cores of circuit design 102 may include IP cores that are used within or by circuit design 102. In the example, circuit design 102 includes "N" IP cores, where N is an integer value. Circuit design 102 may be unencrypted. That is, circuit design 102 may be specified or available as source code with the IP cores of circuit design 102 also being unencrypted.

For example, IP core detector 104 is capable of analyzing a circuit design 102 to determine or detect IP cores included or used in circuit design 102. IP core detector 104 is capable of parsing source code of circuit design 102 or other data of circuit design 102 to detect each of IP cores 1 through N. Inclusion of an IP core within circuit design 102 may mean that the actual source code of the IP core is included in circuit design 102 or that a reference (e.g., a file path) to the source code of the IP core is included in circuit design 102.

As defined herein, the term "Intellectual Property core" or "IP core" means a pre-designed and reusable unit of logic design, a cell, or a portion of chip layout design in the field of electronic circuit design. An IP core may be expressed as a data structure specifying a description of circuitry that performs a particular function. An IP core may be expressed using source code in the form of hardware description language file(s) (e.g., RTL), as a netlist, as a bitstream that programs a programmable IC, or the like. An IP core may be used as a building block within circuit designs adapted for implementation within an IC.

An IP core may include additional resources such as scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

The IP cores may be provided, at least initially, from third-party providers (e.g., entities other than the entity that provides the CAD tool) in encrypted form. Key(s) for decrypting the IP cores may be installed on the data processing system (e.g., the local computer on which the CAD tool executes). The CAD tool may be pointed to the location of the keys, e.g., key data storage 126, as a preference or setting, for example. The IP cores may be encrypted, at least initially and as made available from the respective IP core providers, using asymmetric key technology. As described in further detail below, a session key used by the CAD tool may be protected by an asymmetric key and/or multiple layers of asymmetric keys.

As generally known, asymmetric cryptography, or public-key cryptography, uses pairs of related keys. Each key pair includes a public key and a corresponding private key. Anyone with a public key may encrypt data. Only those with the corresponding private key may decrypt the data. As generally known, in the field of cryptography, a symmetric key is one that is used both to encrypt and decrypt information. Accordingly, to decrypt information, one must have the same key that was used to encrypt the information.

With respect to the IP cores, in general, the IP cores, as provided from the respective IP core providers, may be encrypted using public keys. Users, in acquiring the IP cores or the rights to use the IP cores, also acquire the corresponding private keys that may be installed on the user's data processing system, e.g., in key data storage 126 or another location or directory in a non-volatile storage device. IP core providers also may make the public keys used for encrypting data available to the public, e.g., via download from a website or other network accessible location. These public keys may be used to protect certain information included in and/or used by the CAD tool such as the session key described below. Subsequently, the private keys may be used as part of the process that recovers the protected information (e.g., the session key).

In one or more examples, IP core detector 104 is capable of detecting a number of the IP cores within circuit design 102. The number of IP cores N may be a total number of IP cores included in circuit design 102, a number of the plurality of IP cores having a unique key, or a number of different third-party providers of the plurality IP cores within circuit design 102.

In block 204, framework 100 is capable of generating an encrypted circuit design 112. In the example, key generator 106 generates a session key 110. Session key 110 may be a symmetric key. In one or more examples, session key 110 may be a key that is generated by the CAD tool and known only by the CAD tool. For example, session key 110 may be a sequence of random numbers generated at or about the time or moment that circuit design 102 is encrypted. In one or more examples, session key 110 may be an Advanced Encryption Standard (AES) key. In some examples, session key 110 is used only one time (e.g., a new session key is generated for subsequent sessions to store the circuit design in encrypted form). Encryptor 108-1 is capable generating encrypted circuit design 112 by encrypting circuit design 102 using session key 110.

In block 206, framework 100 generates a key block 116 by encrypting session key 110. Key block 116 is an encrypted version of session key 110. In the example of FIG. 2, session key 110 is provided to encryptor 108-2. Encryptor 108-2 also receives an asymmetric public key 114-1. Encryptor 108-2 generates key block 116 by encrypting session key 110 using asymmetric public key 114-1. The process of generating key block 116 is a first level of protection for session key 110. In one aspect, asymmetric public key 114-1 may only be known by the CAD tool. It should be appreciated that asymmetric public key 114-1 is referred to as "public" only the sense that the key is part of an asymmetric cryptography system and is used for encryption. Asymmetric public key 114-1, as noted, may be kept secret within or as part of the CAD tool to prevent known plain text attacks. Similarly, the corresponding, or paired, asymmetric private key 114-2 of FIG. 3 may only be known by the CAD tool. Asymmetric public key 114-1 or asymmetric private key 114-2, for example, may not be known by the third-party IP core providers or the circuit designer (e.g., user). In one or more examples, keys 114 (e.g., 114-1 and 114-2) may be stored within or as part of the CAD tool.

In one or more examples, asymmetric public key 114-1 and/or the keys for the IP cores may be implemented as Rivest-Shamir-Adleman (RSA) encryption keys as used with RSA asymmetric encryption. RSA is an asymmetric encryption technique that uses two different, but linked keys. In one or more other examples, elliptic curve cryptographic keys and/or encryption may be used.

In block 208, framework 100 divides key block 116 into N different sub-blocks. In the example of FIG. 1, IP core detector 104 may provide the value of N to key block divider 118. Key block divider 118 divides, or segments key block 116 into N different segments, where each segment of key block 116 is referred to as a sub-block 120. Thus, key block divider 118 generates N different sub-blocks 120. It should be appreciated that since key block 116 itself was encrypted, each of sub-blocks 120 is already encrypted despite the segmentation or division described.

For purposes of illustration, consider an example where key block 116 is 64 bytes in length/size and N is equal to 3. In that case, the first sub-block 120-1 may be the first 22 bytes of key block 116, the second sub-block 120-2 may be the next 22 bytes of key block 116, and the third sub-block 120-3 may be the last 20 bytes of key block 116.

In block 210, framework 100 generates a plurality of enhanced sub-blocks 124 by encrypting each sub-block 120 of the plurality of sub-blocks with a different key of a plurality of keys corresponding to the N IP cores. In the example of FIG. 1, each sub-block 120-1 through 120-N is provided to a different encryptor 122-1 through 122-N. Further, each encryptor 122-1 through 122-N is provided with a different public key corresponding to, or associated with, IP cores 1 through N. For example, sub-block 120-1 is encrypted using IP core 1 public key (e.g., the public key used by the IP core provider to initially encrypt IP core 1) to generate enhanced sub-block 124-1; sub-block 120-2 is encrypted using IP core 2 public key (e.g., the public key used by the IP core provider to initially encrypt IP core 2) to generate enhanced sub-block 124-2; and so forth. These public keys are used as additional layers of protection for session key 110 where different ones of the public keys are used to further protect different portions of the key block 116. As noted, the IP core providers typically make their public keys available to the public. In this regard, the CAD tool may obtain the respective public keys for use in block 210. Appreciably, once obtained, the public keys may be stored or maintained in the user's data processing system, e.g., in key data storage 126.

In one or more examples, with the different IP core keys, whether public or private, different encryption techniques may be used by encryptors 122. Encryptors 122 may be configured to use/employ different encryption techniques. In some examples, each encryptor 122 may be configured to implement a different encryption technique. For example, encryptor 122-1 may use a first encryption technique with IP core key 1, encryptor 122-2 may use a second encryption technique with IP core key 2, and so forth. In this example, the first encryption technique is different than the second encryption technique. N different encryption techniques may be used, where each is different or distinct.

In some examples, the particular encryption technique used may be one used by the IP core provider for the corresponding IP core. That is, for example, the encryption technique used by encryptor 122-1 may be the same as the encryption technique used by the IP core provider of IP core 1, and so forth. This provides a level of encryption for each sub-block 120 that is at least on par, or equivalent, with the security strength of each corresponding IP core used on the sub-block as intended and provided by the IP core provider. In combining the keys and encryption techniques as described for the various IP cores used in the design, the level of security strength provided is at least equivalent to the encryption of the original IP core(s) as provided from the IP core provider(s). The level of security strength, in some cases, exceeds that of certain individual IP core encryptions.

The encryption techniques used by encryptors 122 may be any known or later developed encryption technique(s). Example encryption techniques that may be used by encryptors 122 may include, but are not limited to, encryption technique(s) as disclosed in U.S. Pat. No. 11,232,219 to Xilinx, Inc., which is incorporated herein by reference, and "IEEE Recommended Practice for Encryption and Management of Electronic Design Intellectual Property (IP)," in IEEE Std 1735-2014 (Incorporates IEEE Std 1735-2014/Cor 1-2015), pp. 1-90 (23 Sep. 2015), doi: 10.1109/IEEESTD.2015.7274481. The particular encryption techniques listed as examples herein are provided are for purposes of illustration and not limitation.

In one or more alternative examples, the CAD tool is capable of using the public encryption algorithm directly with the respective IP core private keys. That is, the respective private keys for the IP cores may be used to encrypt each sub-block 120 in lieu of the respective public keys. Given that the CAD tool must have access to the private keys to consume the original IP cores, the private keys may be used for both encryption of sub-blocks 120 to generate enhanced sub-blocks 124 and subsequent decryption of enhanced sub-blocks 124 as described in connection with FIGS. 3 and 4.

In an example wherein the value of N represents a number of IP cores in circuit design 102, the number of sub-blocks 120 and number of enhanced sub-blocks 124 will be based on (e.g., equivalent to) the number of IP cores N included in circuit design 102. In an example where N is a number of the plurality of IP cores in circuit design 102 that have a unique key, the number of sub-blocks 120 and number of enhanced sub-blocks 124 will be based on (e.g., equivalent to) the number of IP cores N included in circuit design 102 having a unique key. In some examples, the number N of IP cores having a unique key may be the number of different IP core providers, third-party or otherwise, for the plurality IP cores within circuit design 102. Regardless of the particular implementation, a one-to-one relationship exists between the plurality of enhanced sub-blocks 124 and the plurality of sub-blocks 120.

In the example of FIG. 1, the data processing system executing the CAD tool may include or have access to key data storage 126 or other data repository for storing installed key(s). As noted, keys for IP cores 1 through N, e.g., public keys once obtained, retrieved, or downloaded, whether or not stored in key data storage 126, may be used by framework 100 to generate enhanced sub-blocks 124.

In block 212, framework 100 stores enhanced sub-blocks 124 in memory. In one or more examples, each enhanced sub-block 124 may be stored with or include unencrypted information indicating which IP core key (e.g., 1 through N) was used to generate the enhanced sub-block 124. The information may be an identifier corresponding to the IP core, an identifier corresponding to the third-party provider of the IP core, or a key name. The information may be used to obtain the correct IP core key from data storage 126 at the time that decryption is to be performed.

In one or more examples, framework 100 is capable of storing the plurality of enhanced sub-blocks 124 in memory by including the plurality of enhanced sub-blocks 124 within a file with encrypted circuit design 112. In the example of FIG. 1, framework 100 generates a design container 128 that includes encrypted circuit design 112 and each of the plurality of enhanced sub-blocks 124. In one or more examples, design container 128 may be implemented as a file that includes multiple different types of data. In this example, design container 128 includes an encrypted circuit design 112 and a plurality of enhanced sub-blocks 124. That is, design container 128 includes encrypted circuit design 112 and the encrypted session key, where the encrypted session key is encrypted using a plurality of different keys that depend on the IP cores included in the circuit design.

In one or more examples, framework 100 may be implemented with fewer encryptors or instances of encryptors than illustrated. For example, one or more encryptors (e.g., fewer than the number illustrated in FIG. 1) may be used to perform the various encryption operations described where one or more of such encryptors operate serially to perform different encryption operations using different keys as provided to the encryptor(s) and described herein. In this regard, the particular number of encryptor(s) and/or encryptor instances used is not intended as a limitation of the inventive arrangements.

Figure 3:
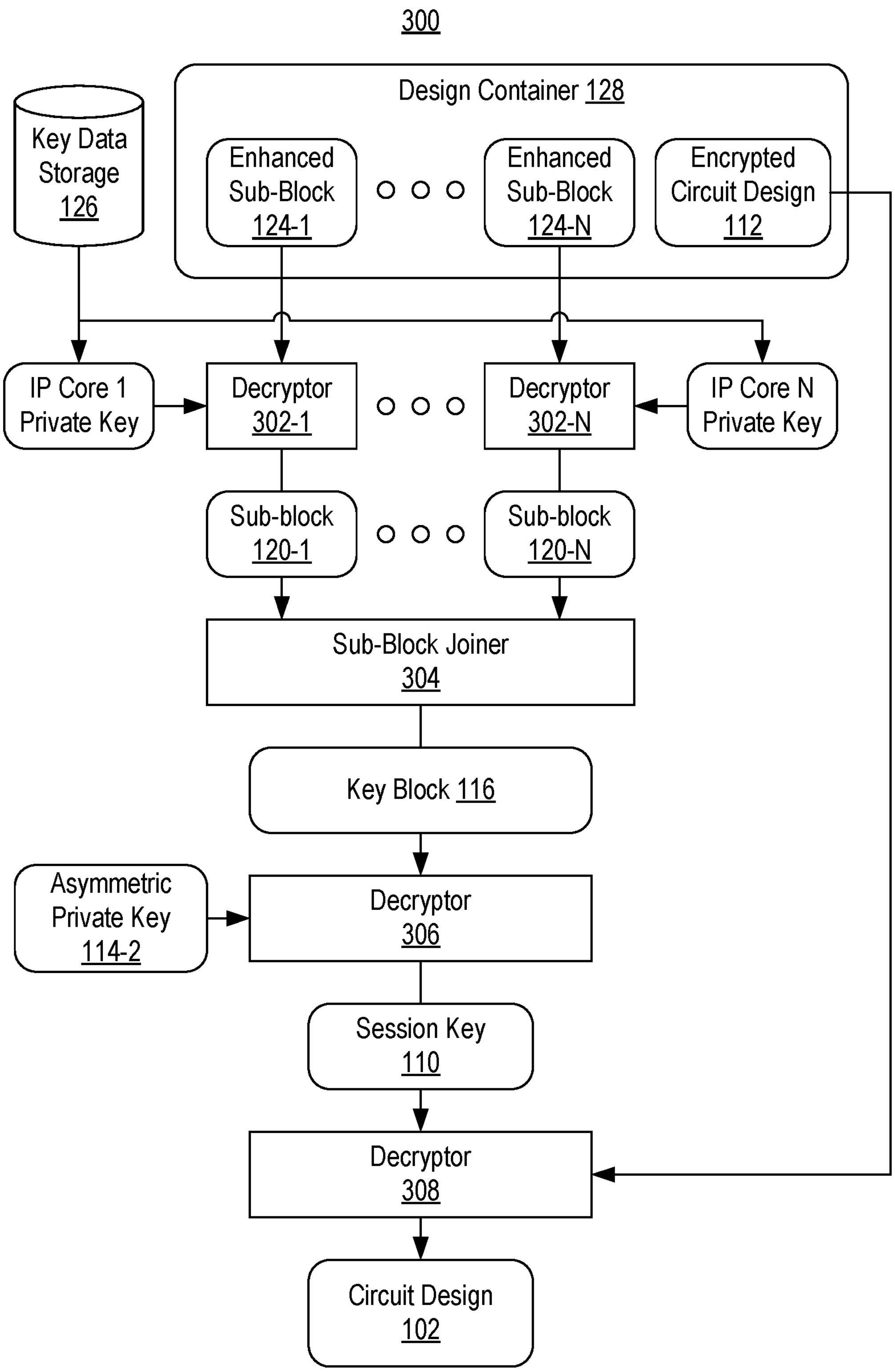
FIG. 3 illustrates another block flow diagram illustrating an example framework that is executable by a data processing system.

FIG. 3 illustrates another block flow diagram illustrating an example framework 300 that is executable by a data processing system. Framework 300 may be implemented as computer-readable program instructions. In one or more example implementations, framework 300 is included within the CAD tool executed by the data processing system. As noted, an example of a data processing system is described within this disclosure in connection with FIG. 5.

In the example of FIG. 3, framework 300 is configured to perform decryption. Framework 300 is operable to recover circuit design 102 when encrypted as described in connection with FIGS. 1-2. For example, a circuit designer using the CAD tool may wish to continue development of, or otherwise access, circuit design 102 as protected within design container 128. Framework 300 is capable of performing the operations necessary to decrypt the circuit design. In the example, framework 300 includes one or more decryptors 302, a sub-block joiner 304, a decryptor 306, and a decryptor 308. FIG. 3 is provided for purposes of illustration and may include fewer or more blocks (e.g., computer readable program code and/or functions) than shown.

Figure 4:
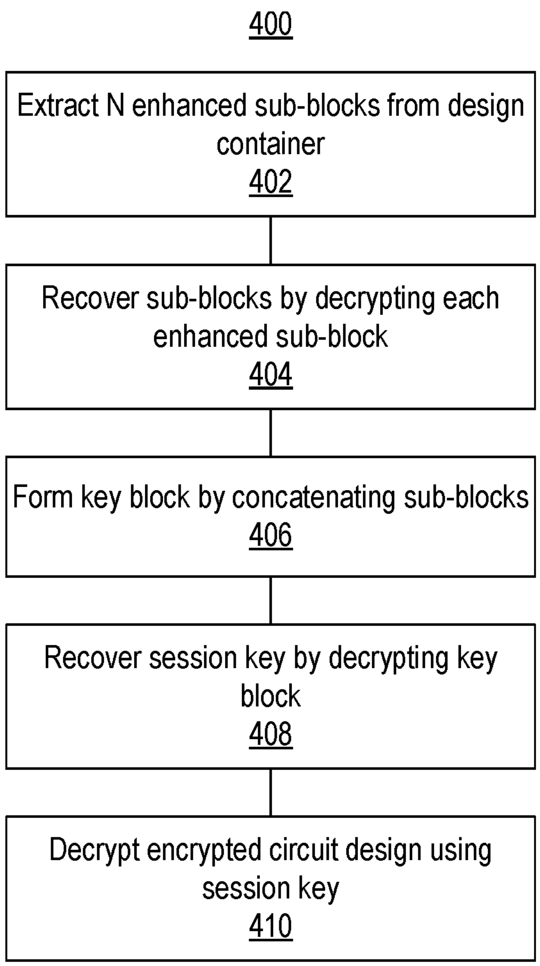
FIG. 4 is an example method illustrating certain operative features of the framework of FIG. 3.

FIG. 4 is an example method 400 illustrating certain operative features of framework 300. Referring to FIGS. 3 and 4, in block 402, framework 300 is capable of extracting the N enhanced sub-blocks 124 from design container 128. In one or more examples, framework 300 is capable of parsing design container 128 to detect each of the plurality of enhanced sub-blocks 124 included therein.

In block 404, framework 300 is capable of recovering the plurality of sub-blocks 120 by decrypting each enhanced sub-block. Framework 300 is capable of providing each enhanced sub-block 124, as extracted from design container 128, to a respective decryptor 302. Each decryptor 302 is capable of accessing key data storage 126, for example, to obtain the correct IP core key for decrypting the received enhanced sub-block 124. That is, each decryptor 302 is capable of retrieving the private key corresponding to the public key used to encrypt the particular enhanced sub-block 124 being decrypted. For example, enhanced sub-block 124-1 is decrypted using IP core 1 private key (e.g., the private key paired with the public key used to initially encrypt IP core 1) to recover sub-block 120-1; enhanced sub-block 124-2 is decrypted using IP core 2 private key (e.g., the private key paired with the public key used to initially encrypt IP core 2) to recover sub-block 120-2; and so forth. The example of FIGS. 3 and 4 illustrates that if the correct IP core keys (e.g., the private keys) are not installed in a repository accessible by framework 300, e.g., meaning that the user of the data processing system does not have the rights to utilize the IP cores, the CAD tool will be unable to decrypt encrypted circuit design 112 to recover circuit design 102 (unencrypted).

In the example of FIG. 3, it should be appreciated that the particular decryption technique implemented by each respective decryptor 302 may be matched, or correspond to, the particular encryption technique used by the corresponding encryptor 122 of FIG. 1. For example, decryptor 302-1 may be configured to implement a decryption technique that complements (e.g., is able to decrypt or reverse) the encryption technique used by encryptor 122-1, decryptor 302-2 may be configured to implement a decryption technique that complements the encryption technique used by encryptor 122-2, and so forth.

As discussed, each enhanced sub-block 124 may include information indicating the correct IP core key to use for decryption. In one or more examples, detection of such information by framework 300 may be used as a mechanism for extracting the N enhanced sub-blocks 124.

In block 406, framework 300 is capable of forming the key block 116 by concatenating sub-blocks 120. For example, sub-block joiner 304 is capable of concatenating sub-blocks 120 to form key block 116. In performing the concatenation, the ordering of sub-blocks 120 may be preserved so that key block 116 may be correctly generated. In one or more example implementations, each enhanced sub-block 124, as generated in accordance with FIGS. 1 and 2, may include an additional identifier indicating an order or sequence of the underlying sub-blocks that may be generated and assigned. This information may be used by sub-block joiner 304 to determine the order or sequence of sub-blocks 120 for the concatenation operation.

In block 408, framework 300 is capable of recovering the session key 110 by decrypting key block 116. For example, decryptor 306 may receive asymmetric private key 114-2. Asymmetric private key 114-2 is the private key that corresponds to, e.g., is paired with, asymmetric public key 114-1. Decryptor 306 generates session key 110 by decrypting key block 116 using asymmetric private key 114-2.

In block 410, framework 300 is capable of decrypting encrypted circuit design 112 using session key 110. For example, decryptor 308 is capable of extracting encrypted circuit design 112 from designer container 128 and recovering circuit design 102. The decryption is performed by decryptor 308 using session key 110 as output from decryptor 306.

In one or more examples, framework 300 may be implemented with fewer decryptors or instances of decryptors than illustrated. For example, one or more decryptors (e.g., fewer than the number illustrated in FIG. 3) may be used to perform the various decryption operations described where one or more of such decryptors operate serially to perform different decryption operations using different keys as provided to the decryptor(s) and described herein. In this regard, the particular number of decryptor(s) and/or decryptor instances used is not intended as a limitation of the inventive arrangements.

Figure 5:
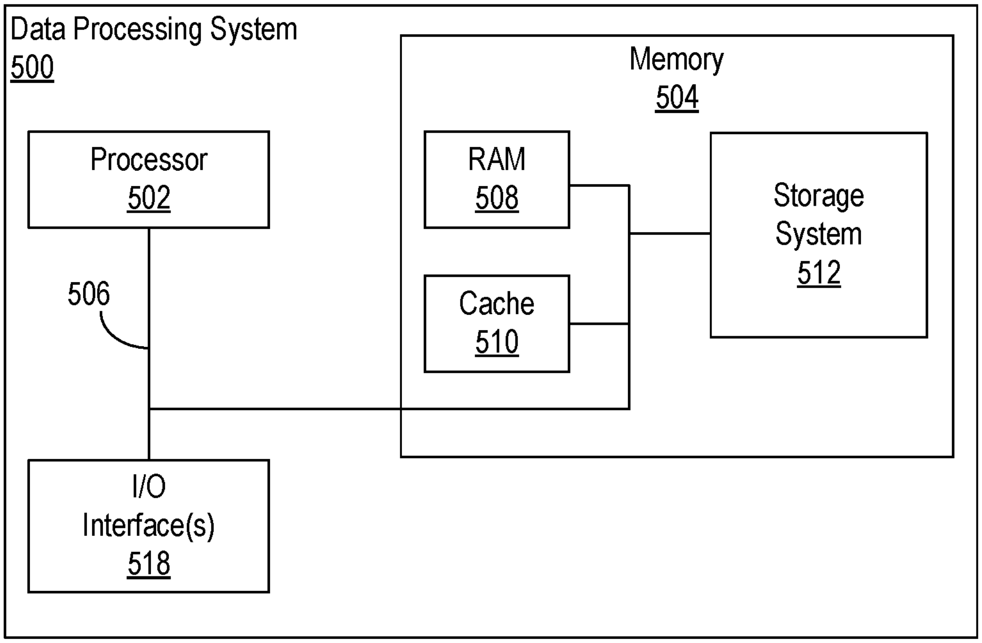
FIG. 5 illustrates an example implementation of a data processing system.

FIG. 5 illustrates an example implementation of a data processing system 500. As defined herein, the term "data processing system" means one or more hardware systems configured to process data, each hardware system including at least one processor and memory, wherein the processor is programmed with computer-readable instructions that, upon execution, initiate operations. Data processing system 500 can include a processor 502, a memory 504, and a bus 506 that couples various system components including memory 504 to processor 502.

Processor 502 may be implemented as one or more processors. In an example, processor 502 is implemented as a central processing unit (CPU). Processor 502 may be implemented as one or more circuits, e.g., a hardware processor, capable of carrying out instructions contained in program code. The circuit may be an integrated circuit or embedded in an integrated circuit. Processor 502 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 506 represents one or more of any of a variety of communication bus structures. By way of example, and not limitation, bus 506 may be implemented as a Peripheral Component Interconnect Express (PCIe) bus. Data processing system 500 typically includes a variety of computer system readable media. Such media may include computer-readable volatile and non-volatile media and computer-readable removable and non-removable media.

Memory 504 can include computer-readable media in the form of volatile memory, such as random-access memory (RAM) 508 and/or cache memory 510. Data processing system 500 also can include other removable/non-removable, volatile/non-volatile computer storage media. By way of example, storage system 512 can be provided for reading from and writing to a non-removable, non-volatile magnetic and/or solid-state media (not shown and typically called a "hard drive"), which may be included in storage system 512. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 506 by one or more data media interfaces. Memory 504 is an example of at least one computer program product.

Memory 504 is capable of storing computer-readable program instructions that are executable by processor 502. For example, the computer-readable program instructions can include an operating system, one or more application programs, other program code, and program data. For example, memory 504 may store the CAD tool that includes framework 100 and/or framework 300. The CAD tool, which is an example of a computer-based design tool, may include other computer readable program instructions that, when executed, perform operations including, but not limited to, synthesis, placement, routing, configuration data and/or bitstream generation (e.g., operations of a design flow) that operate on circuit design 102 or portions thereof. These operations cause circuit design 102 to be physically realized in an IC. Such operations may include loading any configuration data and/or bitstream data into a programmable or partially-programmable IC.

Processor 502, in executing the computer-readable program instructions, is capable of performing the various operations described herein that are attributable to a computer. It should be appreciated that data items used, generated, and/or operated upon by data processing system 500 are functional data structures that impart functionality when employed by data processing system 500. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 500 may include one or more Input/Output (I/O) interfaces 518 communicatively linked to bus 506. I/O interface(s) 518 allow data processing system 500 to communicate with one or more external devices and/or communicate over one or more networks such as a local area network (LAN), a wide area network (WAN), and/or a public network (e.g., the Internet). Examples of I/O interfaces 518 may include, but are not limited to, network cards, modems, network adapters, hardware controllers, etc. Examples of external devices also may include devices that allow a user to interact with data processing system 500 (e.g., a display, a keyboard, and/or a pointing device) and/or other devices such as accelerator card.

Data processing system 500 is only one example implementation. Data processing system 500 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 5 is not intended to suggest any limitation as to the scope of use or functionality of example implementations described herein. Data processing system 500 is an example of computer hardware that is capable of performing the various operations described within this disclosure. In this regard, data processing system 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Some computing environments, e.g., cloud computing environments and/or edge computing environments using data processing system 500 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term “user” means a human being.

As defined herein, the term “hardware processor” means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms “one embodiment,” “an embodiment,” “in one or more embodiments,” “in particular embodiments,” or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term “substantially” means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term “program code” is used interchangeably with the term “program instructions.” Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

generating, by computer hardware, a key block by encrypting a session key used by a computer-based design tool to encrypt a circuit design;

wherein the circuit design includes a plurality of Intellectual Property (IP) cores having a plurality of IP core keys, wherein each IP core has an IP core key of the plurality of IP core keys specific to the IP core that is an encryption key of the IP core;

dividing, by the computer hardware, the key block into a plurality of sub-blocks, wherein each sub-block is a portion of the key block, and wherein the key block is divided into a number of the plurality of sub-blocks based on a number of the plurality of IP cores included in the circuit design;

generating, by the computer hardware, a plurality of enhanced sub-blocks by encrypting each sub-block of the plurality of sub-blocks with a different IP core key of the plurality of IP core keys; and storing the plurality of enhanced sub-blocks in a memory.

2. The method of claim 1, further comprising:

generating, by the computer hardware, an encrypted circuit design by encrypting the circuit design using the session key.

3. The method of claim 2, wherein the storing comprises:

including the plurality of enhanced sub-blocks within a file with the encrypted circuit design.

4. The method of claim 1, wherein the session key is encrypted using an asymmetric public key.

5. The method of claim 1, wherein each enhanced sub-block includes unencrypted information indicating which IP core key of the plurality of IP core keys was used to generate the enhanced sub-block.

6. The method of claim 1, wherein the number of the plurality of sub-blocks generated is based on a number of the plurality of IP cores included in the circuit design having a unique IP core key.

7. The method of claim 1, wherein the number of the plurality of sub-blocks generated is based on a number of different third-party providers for the plurality of IP cores included in the circuit design.

8. The method of claim 1, wherein each enhanced sub-block is encrypted using the different IP core key and a different encryption technique.

9. The method of claim 1, further comprising:

extracting the plurality of enhanced sub-blocks from a file;

recovering the plurality of sub-blocks by decrypting each enhanced sub-block of the plurality of enhanced sub-blocks using an associated IP core key of the plurality of IP cores;

forming the key block by concatenating the plurality of sub-blocks; and recovering the session key by decrypting the key block using an asymmetric private key.

10. The method of claim 9, wherein the file includes an encrypted circuit design generated by encrypting the circuit design, the method further comprising:

decrypting the encrypted circuit design using the session key as recovered from the key block.

11. A method, comprising:

extracting a plurality of enhanced sub-blocks from a file including an encrypted circuit design;

wherein the circuit design includes a plurality of Intellectual Property (IP) cores and each IP core has an IP core-specific IP core key that is an encryption key of the IP core; and wherein a number of the plurality of enhanced sub-blocks extracted corresponds to a number of the plurality of IP cores included in the circuit design;

recovering a plurality of sub-blocks by decrypting each enhanced sub-block of the plurality of enhanced sub-blocks using a different IP core key, wherein each sub-block is a portion of a key block and the key block is a session key that is encrypted;

forming the key block by concatenating the plurality of sub-blocks;

recovering the session key by decrypting the key block using an asymmetric private key; and decrypting the encrypted circuit design using the session key.

12. The method of claim 11, wherein each enhanced sub-block includes unencrypted information indicating which IP core key was used to generate the enhanced sub-block to decrypt the enhanced sub-block.

13. The method of claim 11, wherein the number of the plurality of enhanced sub-blocks is based on a number of the plurality of IP cores included in the circuit design having a unique IP core key.

14. The method of claim 11, wherein the number of the plurality of enhanced sub-blocks is based on a number of different third-party providers for the plurality of IP cores included in the circuit design.

15. The method of claim 11, wherein each enhanced sub-block is decrypted using the different IP core key and a different decryption technique.

16. A system, comprising:

computer hardware configured to execute operations including:

generating a key block by encrypting a session key used by a computer-based design tool to encrypt a circuit design;

wherein the circuit design includes a plurality of Intellectual Property (IP) cores having a plurality of IP core keys, wherein each IP core has an IP core key of the plurality of IP core keys specific to the IP core that is an encryption key of the IP core;

dividing the key block into a plurality of sub-blocks, wherein each sub-block is a portion of the key block, and wherein the key block is divided into a number of the plurality of sub-blocks based on a number of the plurality of IP cores included in the circuit design;

generating a plurality of enhanced sub-blocks by encrypting each sub-block of the plurality of sub-blocks with a different IP core key of the plurality of IP core keys; and storing the plurality of enhanced sub-blocks in a memory.

17. The system of claim 16, wherein the computer hardware is configured to initiate operations further comprising:

generating an encrypted circuit design by encrypting the circuit design using the session key.

18. The system of claim 17, wherein the storing comprises:

including the plurality of enhanced sub-blocks within a file with the encrypted circuit design.

19. The system of claim 16, wherein the number of the plurality of sub-blocks generated is based on a number of the plurality of IP cores included in the circuit design having a unique IP core key.

20. The system of claim 16, wherein each enhanced sub-block includes unencrypted information indicating which IP core key of the plurality of IP core keys was used to generate the enhanced sub-block.

* * * * *